(12) United States Patent
McDonagh

(10) Patent No.: US 10,113,429 B2
(45) Date of Patent: Oct. 30, 2018

(54) LIQUID-CAPTURING SHAFT

(71) Applicant: ROLLS-ROYCE plc, London (GB)

(72) Inventor: Stephen Terence McDonagh, Derby (GB)

(73) Assignee: ROLLS-ROYCE plc, London (GB)

( * ) Notice: Subject to any disclaimer, the term of this patent is extended or adjusted under 35 U.S.C. 154(b) by 630 days.

(21) Appl. No.: 14/819,799

(22) Filed: Aug. 6, 2015

(65) Prior Publication Data

US 2016/0069186 A1 Mar. 10, 2016

(30) Foreign Application Priority Data

Sep. 5, 2014 (GB) .................................. 1415727.5

(51) Int. Cl.
| | |
|---|---|
| *F01D 25/18* | (2006.01) |
| *F01D 5/08* | (2006.01) |
| *F16N 7/36* | (2006.01) |
| *F01M 13/04* | (2006.01) |

(52) U.S. Cl.
CPC ............. *F01D 5/085* (2013.01); *F01D 25/18* (2013.01); *F16N 7/363* (2013.01); *F01M 2013/0422* (2013.01); *F05D 2260/609* (2013.01)

(58) Field of Classification Search
CPC ............. F05D 2260/98; F05D 2240/61; F05D 2240/63; F05D 2260/609; F16N 7/363; F16N 7/36; F02C 7/06; F01D 25/18; F01D 25/20; F01D 5/085; F01D 9/065; F01D 5/08; F16C 2360/23; F16C 33/6677; F16C 33/6659; F01M 2013/0422

See application file for complete search history.

(56) References Cited

U.S. PATENT DOCUMENTS

| | | | | |
|---|---|---|---|---|
| 2,878,894 A | * | 3/1959 | Andrews | ............. F16C 33/6659 184/6.9 |
| 3,561,195 A | | 2/1971 | Bouru | |
| 3,635,312 A | * | 1/1972 | Kaufman | ............. F16C 33/103 184/11.1 |
| 3,796,283 A | * | 3/1974 | Raby | .................. F16C 33/6666 184/11.2 |

(Continued)

FOREIGN PATENT DOCUMENTS

| | | |
|---|---|---|
| DE | 195 01 799 A1 | 7/1996 |
| DE | 10 2012 011 502 A1 | 12/2013 |
| GB | 2 443 526 A | 5/2008 |

OTHER PUBLICATIONS

Jan. 19, 2016 Search Report issued in European Patent Application No. 15 18 0019.

(Continued)

*Primary Examiner* — Justin Seabe
*Assistant Examiner* — Joshua R Beebe
(74) *Attorney, Agent, or Firm* — Oliff PLC

(57) ABSTRACT

There is provided a liquid-capturing shaft (30). The shaft is hollow, arranged for rotation about its longitudinal axis (31), and has a cylindrical wall (32) defining an inner surface (33) and an outer surface (34) of the shaft and through which are formed a plurality of circumferentially spaced apart inlet openings (35). Each inlet opening (35) has a respective inwardly and axially facing capture surface (40) which extends from the outer surface (34) of the shaft to the inner surface (33) of the shaft.

23 Claims, 4 Drawing Sheets

(56) References Cited

U.S. PATENT DOCUMENTS

| | | | | |
|---|---|---|---|---|
| 4,342,489 A | * | 8/1982 | Lenz | F16C 33/6659 184/6.11 |
| 4,468,066 A | * | 8/1984 | Alcorta | F01D 25/18 384/462 |
| 4,648,485 A | * | 3/1987 | Kovaleski | F01D 25/18 184/13.1 |
| 6,139,462 A | | 10/2000 | Gage et al. | |
| 6,409,464 B1 | * | 6/2002 | Fisher | F01D 25/16 384/475 |
| 7,931,407 B2 | * | 4/2011 | Begin | F01D 25/18 384/475 |
| 2003/0039421 A1 | * | 2/2003 | Fisher | F01D 25/18 384/462 |
| 2006/0062504 A1 | * | 3/2006 | Wilton | F01D 25/18 384/475 |
| 2006/0263202 A1 | * | 11/2006 | Dins | F01D 25/20 415/88 |
| 2013/0283758 A1 | * | 10/2013 | Wotzak | F01D 25/18 60/39.08 |

OTHER PUBLICATIONS

Mar. 2, 2015 Search Report issued in British Patent Application No. 1415727.5.

* cited by examiner

LIQUID-CAPTURING SHAFT

The present invention relates to a liquid-capturing shaft, and more particularly relates to a liquid-capturing shaft being arranged for rotation and having a plurality of inlet openings for the capture of liquid. It is envisaged that the shaft may be used in a gas turbine engine, although it is to be appreciated that the shaft may be suitable for use in other types of machinery.

It is known to provide gas turbine engines with liquid-capturing shafts, also known as scoop rotor feeds, to capture lubricating and cooling oil and direct it to one or more sites within the shaft requiring lubrication and cooling, such as bearings. For example, it is common to provide such arrangements on the shafts of multi-shaft engines, in order to capture and direct oil.

Having regard to FIG. 1, a conventional liquid-capturing shaft 1 of this general type has a series of circumferentially spaced through-slots 2 that are designed to catch oil 3 from an externally jetted source 4. The slots 4 are offset from the shaft axis such that, during rotation of the shaft 1 (as indicated by arrow 5) they present an inwardly directed angled surface 6 to a column of oil which is directed towards the shaft from an external oil jet. These devices utilise the inertia of the oil to generate high levels of slip on impact with the surfaces 6 such that the oil is forced inside the shaft before it picks up sufficient rotational speed for centrifugal forces to dominate and drive the oil outwardly against the inner surface of the shaft. This general type of liquid-capturing shaft is used in a variety of applications including the oil-feed to bearings on the known gas turbine engines.

Conventional oil-capture arrangements such as those mentioned above can be inefficient at capturing and directing liquid to predetermined target sites inside the shaft. This poor efficiency can arise due to poor retention of the liquid following its impact with the angled surface 6. Positioned between the slots 2 are recesses (indicated at 7 in FIG. 1) which are designed to capture and direct the liquid. If these recesses 7 are shallow and present insufficient impingement to the flow then some of the liquid can spill over into adjacent slots 2 and subjected to centripetal loading, and can thus be lost from the system. Although barriers can be introduced inside the shaft to redirect the oil in an attempt to address this problem, such arrangements often require significant radial space which may not be available in many machines.

Conventional designs of oil-capture shafts of the type discussed above also make it difficult to reliably distribute and proportion captured oil from each slot 2 to multiple target sites; for example bearings, located at several axial positions along the length of the shaft. Variation in the distribution of captured oil can pose a significant risk to components requiring lubrication such as bearings, splines or gears, and this risk can only be partly mitigated by increasing the feed input of oil from the jets 4. Of course, increasing the number of inlet slots 2 to provide an arrangement in which each slot 2 exclusively serves a single respective lubrication site can address this problem, but such an arrangement often suffer from a reduction in the catch efficiency of the system. The number and size of the openings can also be limited by the load-bearing requirements of the shaft.

It is an object of the present invention to provide an improved liquid-capturing shaft.

According to the present invention, there is provided a liquid-capturing shaft, the shaft being hollow, arranged for rotation about its longitudinal axis, and having a wall defining an inner surface and an outer surface of the shaft and through which are formed a plurality of circumferentially spaced apart inlet openings, each inlet opening having a respective inwardly and axially facing capture surface which extends from the outer surface of the shaft to the inner surface of the shaft.

Each said capture surface may be arranged at a compound angle to a transverse plane through the shaft. Each capture surface may be substantially planar.

Conveniently, each capture surface is arranged at a first acute angle to the longitudinal direction of the shaft.

At least some of said capture surfaces may be arranged to make respective said first angles to the longitudinal direction of the shaft which are different to one another. The capture surfaces can also thereby be arranged to target and apportion oil to different axial positions and/or in different axial directions.

The or each said first acute angle is optionally between 15 and 60 degrees.

Advantageously, each capture surface is arranged at a second acute angle to a plane tangential to the shaft. Optionally, said second acute angle is between 20 and 60 degrees.

Each said inlet opening may be formed as a slot having side edge from which extends a respective said capture surface.

Conveniently, said inlet openings and their respective capture surfaces are all provided in axial alignment with one another so as to be provided in an annular array around the shaft.

Advantageously, the shaft includes a plurality of recesses formed in its inner surface, each said recess being located between a respective pair of said openings.

Optionally, said inner surface of the shaft has an annular step provided at a position located axially adjacent to the annular array of inlet openings, the step defining a transition from a relatively small diameter region of the inner surface around which the openings are provided, to a relatively large diameter region of the inner surface, and wherein said step presents a surface which faces axially in the same direction as said capture surfaces.

Conveniently, the recesses are formed in said relatively small diameter region of the inner surface, and are each configured to be open to said relatively large diameter region of the inner surface through the annular step.

Advantageously, the shaft has a plurality of recessed channels formed in its inner surface, the channels being circumferentially spaced apart from one another and extending along a length of the shaft, away from the inlet openings.

Optionally, each said channel has a concave profile in radial cross-section.

Said channels may extend parallel to the longitudinal axis of the shaft.

Conveniently, said channels are provided in a region of the inner surface which has a larger diameter than said relatively small diameter region.

Advantageously, an annular groove is formed around the inner surface of the shaft, on the opposite side of said step to the inlet openings, and wherein each said channel is open to said groove at one end.

Optionally, the number of said channels is equal to the number of said inlet openings. Alternatively, the number of said channels may be greater than the number of said inlet openings.

The shaft may be arranged within a machine to capture liquid directed towards the shaft from one or more external jets during rotation of the shaft, through the inlet openings, and to direct the liquid along the inner surface of the shaft and axially away from the inlet openings.

Conveniently, the shaft is arranged to direct the liquid along said channels to a plurality of discrete sites within the machine, said sites being arranged along the axial length of the shaft and each being provided in fluid communication with one or more of said channels.

In one such arrangement, said machine is a gas turbine engine, said liquid is a lubricating and/or cooling oil, and said sites are bearings within the gas turbine engine.

So that the invention may be more readily understood, and so that further features thereof may be appreciated, embodiments of the invention will now be described by way of example with reference to the accompanying drawings in which.

Figure 2:
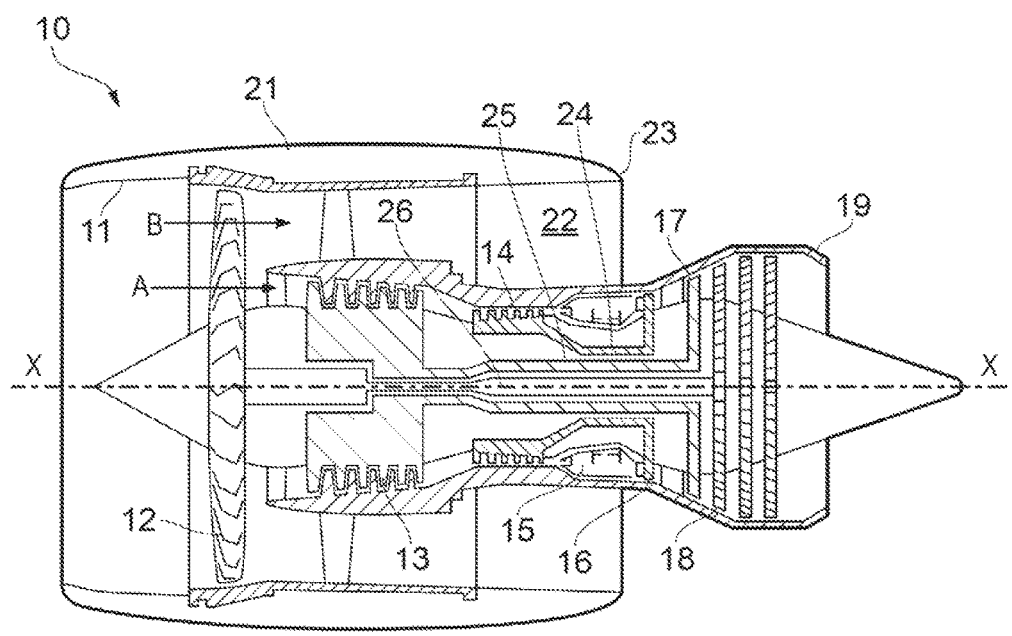
FIG. 2 is a schematic longitudinal axial view through a gas turbine engine of a type in which the present invention may be provided.

Turning now to consider the drawings in more detail, FIG. 2 illustrates a ducted fan gas turbine engine 10 of a type which may incorporate the invention and which has a principal and rotational axis X-X. The engine comprises, in axial flow series; an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 via respective interconnecting shafts 24, 25, 26 which are arranged concentrically.

As will therefore be appreciated, the shafts 24, 25, 26 are arranged for rotation relative to one another during operation of the engine. There are thus provided bearings at positions along the length of the shafts, and between radially adjacent shafts. These bearings require a supply of cooling and lubricating oil, and so there must be provided an arrangement to direct oil inside a shaft and to the bearings therein during rotation of the shaft. The bearings may thus be considered to represent targets for the oil which is generally directed against the outside of a respective shaft from one or more jets 4 arranged around the shaft as indicated generally in FIG. 1 and discussed above.

Figure 3:
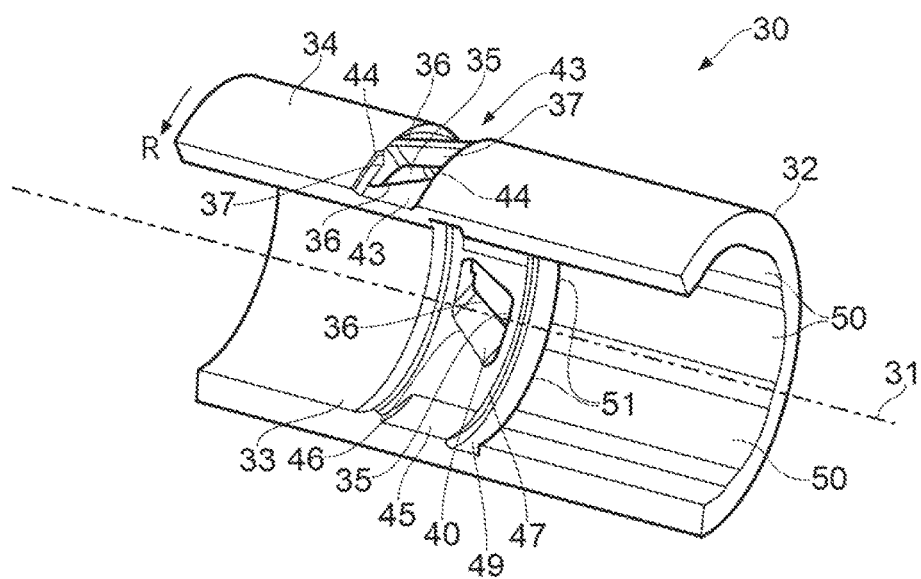
FIG. 3 is a perspective sectional view of a shaft in accordance with an embodiment of the present invention.

FIG. 3 illustrates a shaft 30 embodying the invention, and which is suitable for use in the gas turbine engine 10. The shaft 30 is configured to be rotatable about its longitudinal axis as denoted by arrow R, and has a cylindrical sidewall 32 defining an inner surface 33 and an outer surface 34 of the shaft. FIG. 3 shows the shaft 30 in axial cross-section to illustrate internal features of the shaft, such as the profile of internal oil distribution channels 49 which will be described in more detail below. The actual surface profile illustrated in FIG. 3 is merely illustrative should not be considered essential to the present invention.

A series of inlet openings 35 are provided through the shaft, the openings being circumferentially spaced around the shaft in an annular array. As illustrated most clearly in FIG. 4, each inlet opening 35 takes the form of an elongate slot at the outer surface 34 of the shaft, the specific configuration of the slots shown each having the shape of a parallelogram as viewed in a radial direction. Each slot thus has a pair of parallel long side edges 36 and a pair of parallel short side edges 37. The short side edges 37 are aligned with the circumferential direction of the shaft, as indicated by phantom line 38 in FIG. 4, and the long side edges 36 make an acute angle to the circumferential direction 38. As will be appreciated from FIG. 3, upon rotation of the shaft in the direction R, one of the long side edges 36 will lead the other, such that one may be considered to represent a leading edge 36a of the opening 35 and the other may be considered to represent a trailing edge 36b of the opening 35.

Each inlet opening 35 extends through the sidewall 32 of the shaft so as to be open to the hollow interior of the shaft. Each opening 35 thus defines a pair of opposing surfaces 39, 40, each of which extends from the outer surface 34 of the shaft to the inner surface 33 of the shaft. One of the surfaces, 39, extends inwardly from the leading edge 36a of the opening 35 at the outer surface 34 of the shaft, and the other surface, 40, extends inwardly from the trailing edge 36b of the opening 35 at the outer surface 34 of the shaft. The two opposing surfaces 39, 40 are shown as both being substantially planar, and they may be parallel to one another, although this parallel relationship is not essential. What is important to note, however, is that the surface 40 which extends inwardly from the trailing edge 36b of the opening 35 at the outer surface of the shaft, is arranged so that it faces both inwardly and axially of the shaft. This surface will act as a capture surface 40 to capture oil jetted towards the rotating array of inlet openings 35, in the general manner shown in FIG. 1.

Figure 4:
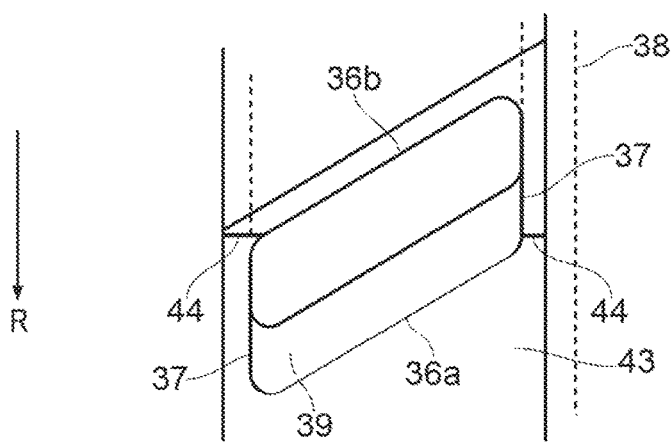
FIG. 4 shows a region of the shaft of FIG. 3, as viewed in a radially inwards direction from outside the shaft.
Figure 5:
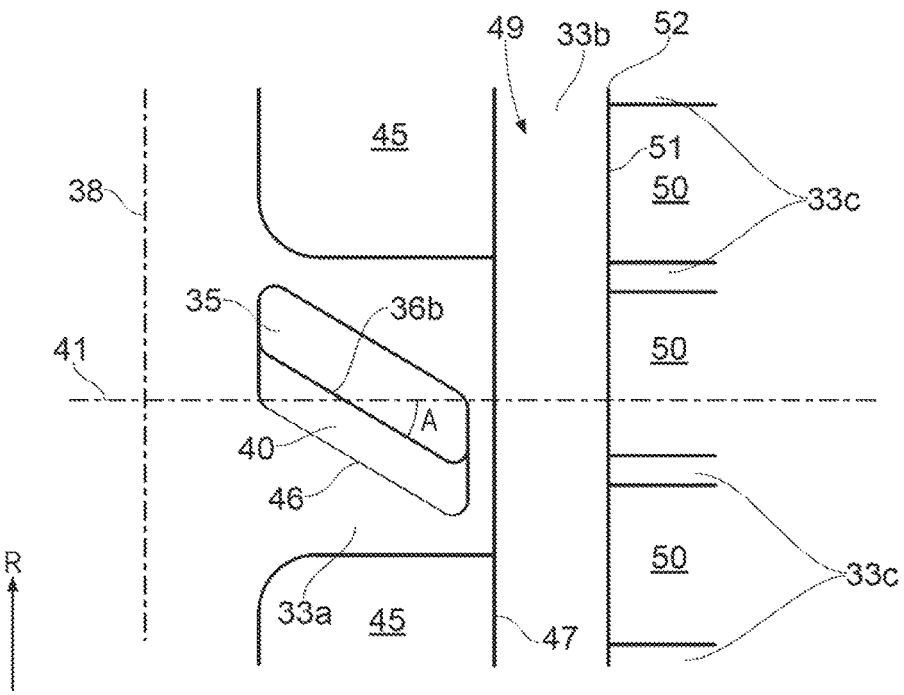
FIG. 5 shows a region of the shaft of FIG. 3, as viewed in a radially outwards direction from the axis of the shaft.
Figure 7:
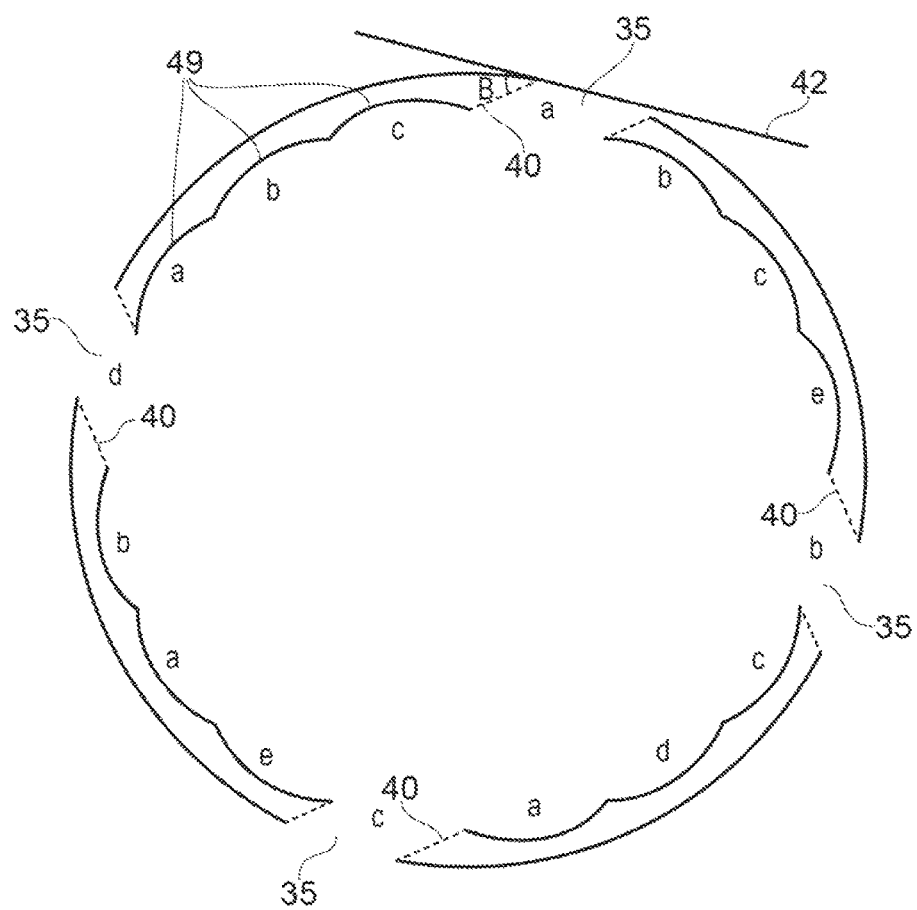
FIG. 7 is a schematic transverse cross-section through the shaft.

The above-mentioned inwardly and axially facing orientation of the capture surface 40 arises because the surface 40 is arranged at a compound angle to a transverse reference plane through the shaft (said plane including the line 38 denoted on FIGS. 4 and 5, and lying perpendicular to the page). This compound angle arises because the capture surface 40 is arranged at a first acute angle A to the longitudinal direction 41 of the shaft, and a second acute angle B to a reference plane 42 tangential to the shaft (as shown in FIG. 7). The first angle A may be between 15° and 60°, in either axial direction, with optimum oil-capture performance expected to arise at an angle of approximately 45°, depending on the speed of rotation of the shaft. The second angle B may be between 20° and 60°.

As shown most clearly in FIG. 3, on the outside of the shaft 30 there may be provided lead-in recesses 43 ahead of each opening 35 (in the rotational sense). The recesses 43 are shown in FIG. 3 as being tapered such that their radial depth below the main cylindrical outer surface 34 of the shaft 30 increases towards their respective openings 35. The recesses 43 terminate at a pair of steps 44, each step being formed at a respective end of the slot-shaped opening 35 as illustrated most clearly in FIG. 4.

As shown most clearly in FIGS. 3 and 5, the inner surface 33 is also provided with a series of recesses 45, the recesses 45 being positioned between successive openings 35 so as to be close to, but not contiguous with the openings 35. The recesses 45 may, as illustrated, be aligned with the annular array of openings 35, and each may have a tapered profile such that its radial depth increases towards the adjacent opening 35 which follows the recess 45 in a rotational sense. As shown in FIG. 3, in this particular configuration, each recess 45 is thus shallowest in its region closest to the trailing edge 46 of the adjacent capture surface 40 which is rotationally ahead of the recess 45.

Figure 6:
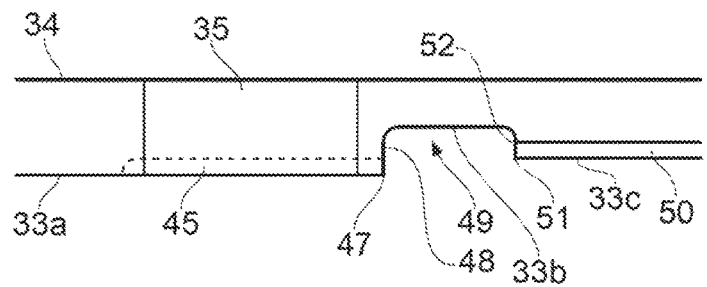
FIG. 6 is a radial cross-sectional view of the region of the shaft shown in FIG. 5.

An annular spill-over step 47 is provided around the inside of the shaft, the step 47 being positioned axially adjacent, but spaced slightly from, the annular array of inlet openings 35 and their respective capture surfaces 40, as shown in FIGS. 5 and 6. The step 47 defines a stepped transition from a first relatively small diameter region 33a of the inner surface, around which the openings 35 are provided, to a second relatively large diameter region 33b of the inner surface. As will be noted from FIG. 5 in particular, the capture surface 40 faces axially towards the step 47. As shown in FIG. 6, the step 47 presents a shoulder surface 48 which faces axially in the same direction as the capture surface 40. As will be noted, the relatively large diameter region 33b of the shaft defines an annular distribution groove 49 around the inside of the shaft.

As illustrated in FIG. 6, the internal recesses 45 which are formed in the small diameter region 33a of the inner surface between the openings 35 may be open to the relatively large diameter region 33b of the inner surface, and hence the annular groove 49, through the step 47, at least in their radially deepest areas, via discontinuities in the step 47. This open-sided configuration of the radially deepest areas of the recesses 45 can also be seen in FIG. 3.

Figure 1:
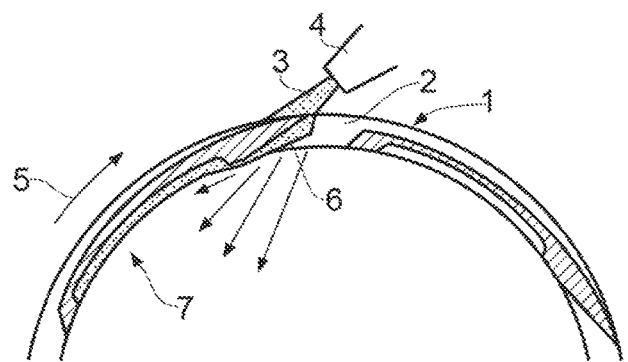
FIG. 1 (discussed above) is a transverse-cross sectional view through part of a prior art liquid-capturing shaft.

During rotation of the shaft 30, oil is directed against the annular region of the shaft about which the openings 35 are provided, from external jets in a generally similar manner to that illustrated in FIG. 1. Oil will thus enter the interior of the shaft via the openings, and due to the rotation of the shaft the oil will impinge on the capture surfaces 40 associated with the openings. Because the capture surfaces 40 are arranged so as to face axially as well as inwardly of the shaft, the majority of the captured oil will be urged axially (sideways to the right in FIGS. 3 and 5), and will spill over the step 47 to fill the annular groove 49 thereby creating a reservoir of oil. The step 47 will prevent, or at least significantly reduce, any return flow of this component of the oil back towards the openings 35. The internal recesses 45 between the openings 35 and their associated capture surfaces serve to catch any deflected oil or thin film oil which spills over from the capture surfaces 40 and is thus not directed immediately axially by the capture surfaces 40. Any such oil captured by the recesses 45 will then also be urged axially away from the array of openings 35, over or through the step 47 and into the annular groove 49. The above-described manner in which the recesses 45 are tapered helps to encourage oil captured by the recesses to flow into the annular groove 49.

In order to direct the captured oil to predetermined target sites within the shaft 30, the shaft is also provided with a plurality of internal feed channels 50. The channels 50 are recessed into a third region 33c of the shaft's inner surface which is larger in diameter than the first region 33a but somewhat smaller in diameter than the second region 33b which defines the annular groove 49. The feed channels 50 are each open at their ends 51 to the annular groove 49 for fluid communication with the reservoir of oil formed therein through a step 52 (shown most clearly in FIG. 6) defined between the second region 33b of the shaft's inner surface and the third region 33c. The feed channels 50 are circumferentially spaced apart from one another around the shaft and are oriented to be generally parallel to the longitudinal axis 31 of the shaft. Oil flows from the reservoir collected in the annular groove 49, into the discrete feed channels 50 and is thereby distributed along each channel 50 to the required axial position along the shaft.

The channels 50 may have a concave radial cross-section as illustrated most clearly in FIG. 1, and so take the form of "scallops" formed around the inside of the shaft.

Each channel 50 extends away from the array of inlet openings 35 as shown, and terminates at one of the target sites to which oil is to be fed, and is thus arranged in fluid communication with the target site to direct oil from the spill-over step 47, away from the openings 35 and on to the target sites during rotation of the shaft.

As each capture surface 40 rotates through the cone of oil produced by each external jet, the angle which the capture surface 40 presents to the jet of oil changes. Also, the point on the contact surface 40 against which the oil impacts will also move. This has the effect of spreading the oil which is deflected by the capture surfaces 40 over a large proportion of the inner surface of the shaft. The deflected oil retains considerable speed differential relative to the shaft and thus continues to spill around the inner surface of the shaft until the speed differential reduces. Although contact between the sprayed oil and successive contact surfaces 40 during rotation of the shaft ensures oil wetting around the entire inner surface of the shaft 30, the circumferential distribution of the oil may still be uneven. Consequently, if there is no annular groove 49 provided axially between the array of capture surfaces 40 and the feed channels 50, such that the capture surfaces 40 are thus arranged to direct captured oil directly at the array of feed channels 50, some of the feed channels can receive more oil than others.

The provision of the annular distribution groove 49 around the inside of the shaft creates a single oil reservoir, utilising the centrifugal forces to maintain a constant weir height. Each of the feed channels 50 is open to the groove at one end 51 through the step 52, and has the same profile, with minimal tolerance variation in radial depth. In such an arrangement, the captured oil spills over the step 47 and into the groove 49, from where it then feeds into the channels 50 in a relatively even distribution. This configuration also has the advantage of permitting the number of feed channels 50 to be selected independently of the number of inlet openings 35 and their associated capture surfaces 40. However, in some machine installations it is possible that there might not be sufficient axial space to allow the provision of a distribution groove 49 of this type between the spill-over step 47 and the feed channels 50, and it may therefore be necessary in some cases to allow direct distribution of the oil from the spill-over step 47 to the feed channels.

In this regard, it is to be noted that an acceptably even distribution of oil between the feed channels 50 can be achieved by providing an equal number of feed channels 50 and inlet openings 35. By minimizing the circumferential spacing between adjacent feed channels 50, spill-over from one channel to the next can be minimised. Also, any such spill-over from one channel 50 to the next will be relatively even across the array of the channels, thereby balancing out the distribution of oil between them. However, in cases where there are a greater number of lubrication sites than there are inlet openings 35, such an arrangement is not always practical because of the need to ensure that each channel 50 should feed only one target site.

When oil is to be targeted directly at the feed channels 50, it is considered advantageous to minimise the axial spacing between the open ends 51 of the feed channels 50 and the spill-over step 47, and also to minimise the axial spacing between the spill-over step 47 and the inlet openings 35

FIG. 7 illustrates schematically an array of feed channels and a distribution scheme which may be used in a situation in which more target sites must be fed than there are inlet openings 35. FIG. 7 specifically illustrates an arrangement configured to feed five target sites from four inlet openings 35. The feed channels 49 are allocated to the target sites as shown, with letters a, b, c, d and e relating to respective sites. The feed channels 49 are thus divided into groups, with the number of groups being equal to the number of inlet openings 35 (d and e collectively making one group in the arrangement illustrated in FIG. 7). One feed channel 49 for each angular position relative to the openings 35 is allocated to each group. This type of allocation scheme means that the circumferential variation of oil between the feed channels is evened out, according to the expression:

$$\Sigma a \approx \Sigma b \approx \Sigma c \approx \Sigma(d+e)$$

Components such as bearings can be very sensitive to the flow rate of oil supplied to them, particularly as the oil has a major effect in cooling the bearings as well as lubricating them. It is therefore proposed that each target site will usually be provided in fluid communication with a dedicated group of feed channels 49. Sub-dividing some or all of the groups a, b, c, and d & e to feed more than one target site is possible albeit there will be some uncertainty over the oil distribution. This would be more suitable for target features which are less sensitive to oil flow rate. For example, splines often require oil for lubrication, but less so for cooling. Group (d+e) designated in FIG. 7 could be sub-dived with channels 'd' feeding one spline and channels 'e' feeding another. In summary, it has been found that the shaft of the present invention offers significant advantages over prior art shaft designs such as that illustrated in FIG. 1. In particular, because the capture surface 40 of each inlet opening 35 is arranged so as to face both inwardly and axially of the shaft, liquid captured by via the inlet openings 35 is directed both internally and axially along the shaft, which greatly reduces the likelihood of captured liquid from spilling over into successive inlet openings, whereupon it can escape the shaft. Additionally, the provision of the spill-over step 47 around the shaft and axially adjacent the inlet openings 35 also prevents any return flow of liquid back towards the inlet openings, whilst also reducing the residence time of the liquid in that area.

Whilst the invention has been described above with specific reference to embodiments configured for use in capturing oil in gas turbine engines, it is to be appreciated that the present invention is not limited to use in such arrangements, and can be embodied in shafts configured to capture other liquids and for use in other types of machines.

Whilst the invention has been described above with specific reference to an embodiment in which all of the capture surfaces 40 are arranged to make equal angles A to the longitudinal direction 41 of the shaft, it is envisaged that some embodiments may be configured such that at least some of the capture surfaces 40 provided around the shaft may be arranged at respective angles A to the longitudinal direction 41 of the shaft which are different to one another. Some of the capture surfaces 40 could even be arranged so as to be axially facing in an opposite axial direction to others. These types of arrangements can be configured such that respective capture surfaces 40 are effective to target and apportion oil to different axial positions along the shaft and/or in different axial directions along the shaft.

Furthermore, whilst the specific embodiment described above and illustrated in the drawings is configured to have inlet openings 35 in the form of elongate slots in the shape of parallelograms, other shapes and configurations for the inlet openings 35 are also possible. For example, it is envisaged that in some embodiments the leading edges 36a might be straight but non-parallel with the trailing edges 36b, in which case the inlet openings 35 would take the form of a trapezoidal slot. In other arrangements, it is envisaged that the leading edges 36a (and the surface 39 extending inwardly therefrom) and/or the side edges 37 (and their associated inwardly directed side surfaces) of the inlet openings could be stepped or curved. The trailing edge 36b of each inlet opening 35 (and its associated capture surface 40) could also be curved or stepped in profile, although this will give a variable first angle A to the longitudinal direction of the shaft.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A liquid-capturing shaft, the shaft being hollow, arranged for rotation about a longitudinal axis of the shaft, comprising:
   a wall defining an innermost surface and an outermost surface of the shaft and through which are formed a plurality of circumferentially spaced apart inlet openings; and
   each inlet opening having a respective capture surface which extends from the outermost surface of the shaft and through the innermost surface of the shaft, such that the capture surface extends through the wall along a plane that extends obliquely with respect to the longitudinal axis.

2. A shaft according to claim 1, wherein each said capture surface is arranged at a compound angle to a transverse plane through the shaft.

3. A shaft according to claim 1 wherein each capture surface is substantially planar.

4. A shaft according to claim 1, wherein each capture surface is arranged at a first acute angle (A) to the longitudinal direction of the shaft.

5. A shaft according to claim 4, wherein at least some of said capture surfaces are arranged to make respective first acute angles to the longitudinal direction of the shaft which are different to one another.

6. A shaft according to claim 4, wherein each of the first acute angle is between 15 and 60 degrees.

7. A shaft according to claim 1, wherein each capture surface is arranged at a second acute angle to a plane tangential to the shaft.

8. A shaft according to claim 7, wherein said second acute angle is between 20 and 60 degrees.

9. A shaft according to claim 1, wherein each said inlet opening is formed as a slot having a side edge from which extends a respective said capture surface.

10. A shaft according to claim 1, wherein said inlet openings and their respective capture surfaces are all provided in axial alignment with one another so as to be provided in an annular array around the shaft.

11. A shaft according to claim 10, further including a plurality of recesses formed in its innermost surface, each said recess being located between a respective pair of said openings.

12. A shaft according to claim 10, further including:
a plurality of recesses formed in its innermost surface,
each said recess being located between a respective pair of said openings and
wherein:
said innermost surface of the shaft has an annular step provided at a position located axially adjacent to the annular array of inlet openings, the step defining a transition from a relatively small diameter region of the innermost surface around which the openings are provided, to a relatively large diameter region of the innermost surface, and
said step presents a surface which faces axially in the same direction as said capture surfaces.

13. A shaft according to claim 12, wherein said recesses are formed in said relatively small diameter region of the innermost surface, and are each configured to be open to said relatively large diameter region of the innermost surface through the annular step.

14. A shaft according to claim 1, having a plurality of recessed channels formed in its innermost surface, the channels being circumferentially spaced apart from one another and extending along a length of the shaft, away from the inlet openings.

15. A shaft according to claim 14, wherein each said channel has a concave profile in radial cross-section.

16. A shaft according to claim 14, wherein said channels extend parallel to the longitudinal axis of the shaft.

17. A shaft according to claim 14, further including:
a plurality of recesses formed in its innermost surface,
each said recess being located between a respective pair of said openings, and
wherein:
said innermost surface of the shaft has an annular step provided at a position located axially adjacent to the annular array of inlet openings, the step defining a transition from a relatively small diameter region of the innermost surface around which the openings are provided, to a relatively large diameter region of the innermost surface,
said step presents a surface which faces axially in the same direction as said capture surfaces, and
said channels are provided in a region of the innermost surface which has a diameter which is larger than said relatively small diameter region.

18. A shaft according to claim 17, wherein an annular groove is formed around the innermost surface of the shaft, on the opposite side of said step to the inlet openings, and wherein each said channel is open to said groove at one end.

19. A shaft according to claim 14, wherein the number of said channels is equal to the number of said inlet openings.

20. A shaft according to claim 14, wherein the number of said channels is greater than the number of said inlet openings.

21. A shaft according to claim 1, the shaft being arranged within a machine to capture liquid directed towards the shaft from one or more external jets during rotation of the shaft, through the inlet openings, and to direct the liquid along the innermost surface.

22. A shaft according to claim 20, the shaft being arranged to direct the liquid along said channels to a plurality of discrete sites within the machine, said sites being arranged along the axial length of the shaft and each being provided in fluid communication with one or more of said channels.

23. A shaft according to claim 21, wherein said machine is a gas turbine engine, said liquid is a lubricating and/or cooling oil, and said sites are bearings within the gas turbine engine.

* * * * *